US005347692A

United States Patent [19]

Ebata

[11] Patent Number: 5,347,692

[45] Date of Patent: Sep. 20, 1994

[54] SLIDER PULL TAB

[75] Inventor: Hirokazu Ebata, Uozu, Japan

[73] Assignee: Yoshida Kogyo K.K., Tokyo, Japan

[21] Appl. No.: 169,053

[22] Filed: Dec. 20, 1993

[30] Foreign Application Priority Data

Dec. 22, 1992 [JP] Japan .................................. 4-342784

[51] Int. Cl.⁵ ................................................ A44B 19/00

[52] U.S. Cl. ........................................... 24/429; 24/419

[58] Field of Search ................. 24/429, 419, 420, 421, 24/437; 70/68; 294/3.6

[56] References Cited

U.S. PATENT DOCUMENTS 4,790,050 12/1988 Ishii ....................................... 24/429
4,823,447 4/1989 Akashi ...................................... 24/419
4,985,969 1/1991 Terada et al. .......................... 24/429

FOREIGN PATENT DOCUMENTS 62-102407 6/1987 Japan .
245006 2/1990 Japan .

*Primary Examiner*—Victor N. Sakran
*Attorney, Agent, or Firm*—Hill, Steadman & Simpson

[57] ABSTRACT

A slider pull tab for slide fasteners has a connecting means formed of a rigid material for connecting a pull tab body of an elastic, flexible material to a slider. The connecting means has a chamber and a window communicating therewith for fitting engagement with an anchoring member. A mold material (M) is injection-molded to form the pull tab simultaneously with the formation of an integral joint in the chamber in which the mold material (M) is anchored in place by the anchoring member relative to the connecting means.

7 Claims, 4 Drawing Sheets

SLIDER PULL TAB

BACKGROUND OF THE INVENTION

1. Field of the Invention

This invention relates to sliders for slide fasteners, more particularly to a slider pull tab made of an elastic, flexible material such as synthetic rubber, synthetic leather or other elastic synthetic resinous materials.

2. Prior Art

There are known a variety of slide fastener sliders having different forms and designs of pull tab which are tailored to meet with the particular specifications set up by the garment manufactures who produce all sorts of garment articles ranging from clothing, sports wear, sports equipment to bags, etc.

There are known a variety of pull tabs connected to slide fastener sliders for moving the latter reciprocally along a pair of fastener stringers. For ease of manipulation, aethetic preference and other advantages over conventional metal counterparts, there is a growing demand for slider pull tabs made of a soft rubber, resin or other such flexible material that can render the pull tab flexible or pliable. Different means have been proposed to provide satisfactory connection between the body of the pull tab and the body of the slider. Japanese Laid-Open Utility Model Publication No. 62-102407 proposes the use of a connector pivotally linked at one end to a trunnion on a slider body, in which case the other end of the connector is embedded in a web of elastic, flexible rubber or resin forming a pull tab. Since the connector is joined to a limited area of the elastic web material of the pull tab, its strength of pull relative to the slider is rather weak, leading to damage or separation from the slider over prolonged periods of time in use.

Another proposal is made in Japanese Laid-Open Patent Publication No. 2-45006 in which two metallic connectors are used to connect a pull tab body to a slider, the pull tab body being cast-molded together with one of the two connectors having a reinforcing strip.

This prior device is complicated in construction and hence difficult to manufacture, added by the presence of such a reinforcing strip which would make the pull tab as a whole less flexible.

SUMMARY OF THE INVENTION

With the foregoing drawbacks of the prior art in view, the present invention seeks to provide a slider pull tab for a slide fastener which has a highly mechanically strong joint relative to the slider and yet retains sufficient flexibility to facilitate manipulation of the slider.

A slide pull tab according to the invention comprises a slider pull tab for slide fastener which comprises a pull tab body having a web portion formed by molding an elastic, flexible material; a connecting means made from a rigid material and having a chamber for receiving a molding material to form an integral joint with one end of said pull tab body, said connecting means having a window communicating with said chamber; and an anchoring member adapted to extend through said window into said chamber end having a retainer means for anchoring said molding material.

The above and other features and advantages of the invention will appear more apparent from the following detailed description taken in connection with the accompanying drawings. Like reference numerals refer to like or corresponding parts throughout the several views.

DETAILED DESCRIPTION OF THE INVENTION

Figure 1:
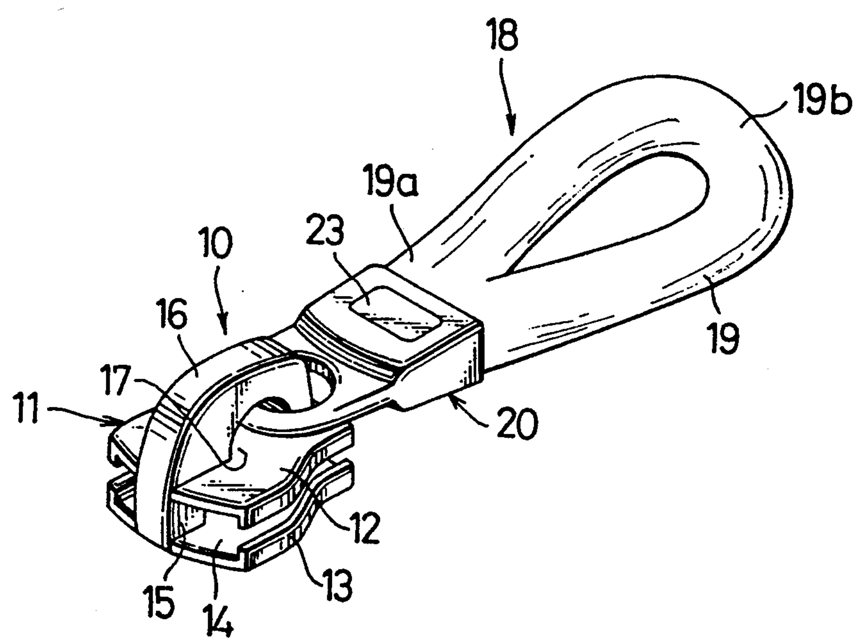
FIG. 1 is perspective view of a slider having a pull tab embodying the invention.
Figure 2:
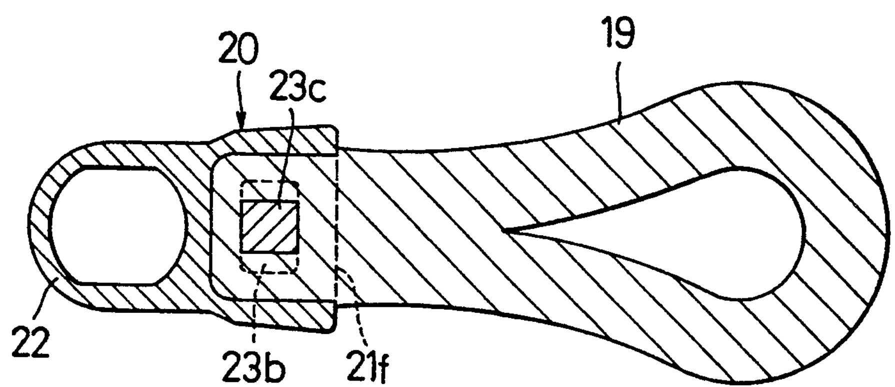
FIG. 2 is a longitudinal cross-sectioned plan view of the slider pull tab shown in FIG. 1.

Referring now to the drawings and FIG. 1 in particular, there is shown a slider 10 connected to a pull tab 18 embodying the invention which is used to open and close a slide fastener. The slider 10 comprises a slider body 11 formed by an upper flange 12 and a lower flange 13 defining therebetween a guide channel 14 for the passage of a slide fastener not shown and connected together at one of its ends by a neck 15 (commonly known as a diamond), and an arch-shaped trunnion 16 having an aperture 17 for pivotally receiving the pull tab 18.

The pull tab 18 comprises a pull tab body 19 formed from an elastic, flexible material such as soft synthetic rubber, resin or other moldable materials and having a web portion **19*a* and a loop portion 19*b*. The pull tab 18 includes a connecting means or clamper 20 made of a metal or other rigid materials and connected at one of its ends with the web portion 19*a* and at the opposite end with the slider 10**.

As better shown in FIG. 4, the clamper 20 has a rectangular box 21 formed by an upper wall **21*a*, a lower wall 21*b*, a pair of side walls 21*c*, 21*c* and a front end wall 21*d* jointly defining therebetween a rectangular chamber 21*e* for receiving through an inlet 21*b* a molding material for purposes hereinafter to be described. Extending from the front end wall 21*d* is an annular hook 22 for pivotal engagement with the trunnion 16 as shown in FIG. 1**.

Figure 3:
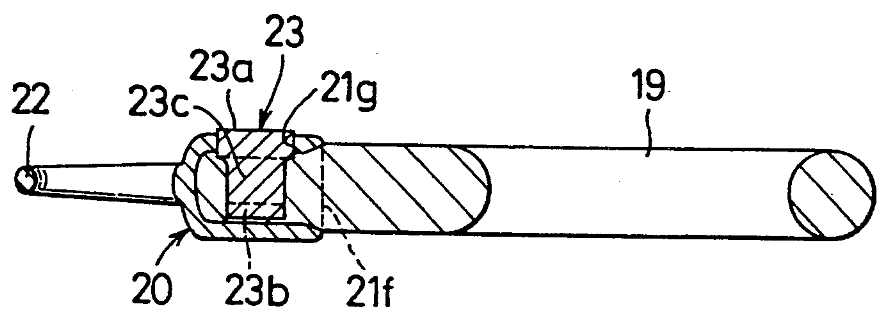
FIG. 3 is a longitudinal cross-sectional slide view of the same.

Formed centrally in the upper wall **21*a* of the clamper 20 is a rectangular window 21*g* communicating with the chamber 21*e* for receptive engagement with an anchoring member 23 and having a flared marginal edge 21*g*'. The anchoring member 23 has an upper rectangular plate 23*a* and a lower rectangular plate 23*b* joined together in spaced relation by a retaining post 23*c* to provide on opposite sides thereof a pair of bays 23*d*, 23*d* to be filled with a molding material in a manner hereinafter to be described. The upper plate 23*a* has tapered peripheral edges 23*a*' dimensioned to snugly fit complimentarily with the flared marginal edge 21*g*' of the window 21*g* so as to make the upper surface of the upper plate 23***a* lie substantilly flat and flush with the upper surface of the upper wall 21*a* of the clamper 20, as shown in FIG. 3.

Figure 8:
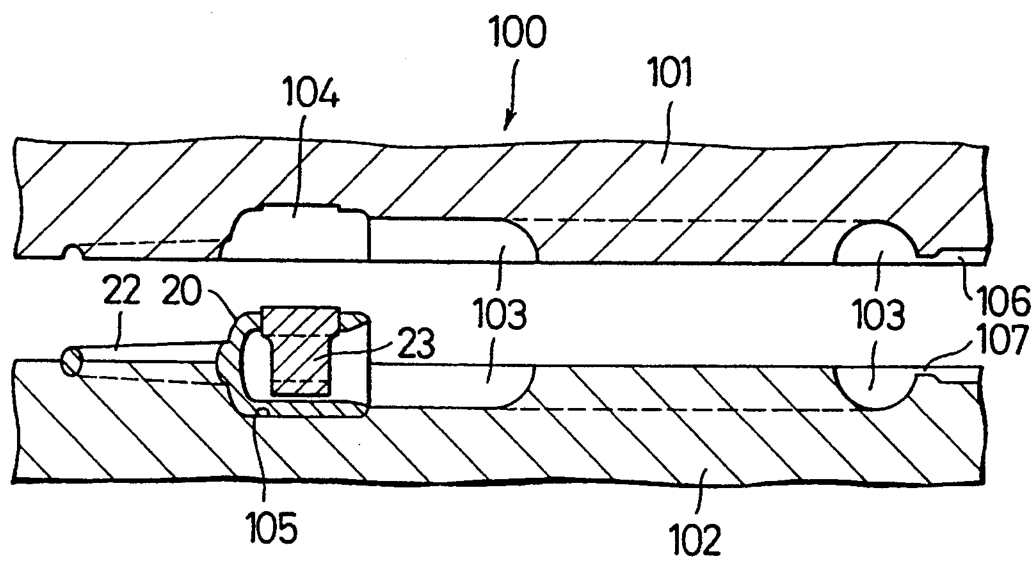
FIG. 8 is a schematic longitudinal cross-sectional view utilized to form the pull tab of FIG. 3 and shown separated prior to charging of a molding material.
Figure 9:
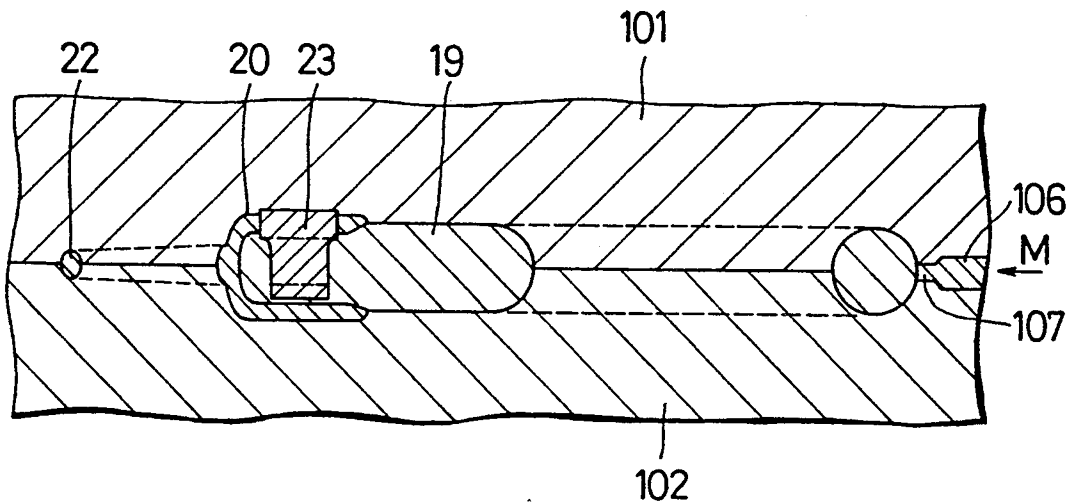
FIG. 9 is a view similar to FIG. 8 but showing the mold closed for charging a molding material.

Turning to FIGS. 8 and 9, there is schematically shown an injection-molding device 100 which comprises a pair of vertically opposed mold halves 101 and 102 each having first indentical cavity halves 103, 103 for forming the pull tab body 19 and second cavity halves 104, 105 configured to respectively receive the upper and lower half portions of the clamper 20. Assembled with the anchoring member 23, the clamper 20 is placed in the second lower cavity 105 as shown in FIG. 8, followed by closure of the upper and lower molds 101 and 102 as shown in FIG. 9 whereupon a molding material M is fed through a runner 106 and a gate 107 into the first cavity 103 and progressively further into the second cavity 104, 105 until the material M completely fills up the chamber 21*e* of the clamper 20 including the bays 23*d*, 23*d*. As the molding operation is complete under conditions well known in the art, the molds 101, 102 are opened to produce an integral pull tab structure having a substantial mass of molding material M filled and cured in a relatively large space or chamber 21*e* of the clamper 20 to form a firm, strong joint between the pull tab body 19 and the clamper 21*e*.

Figure 5:
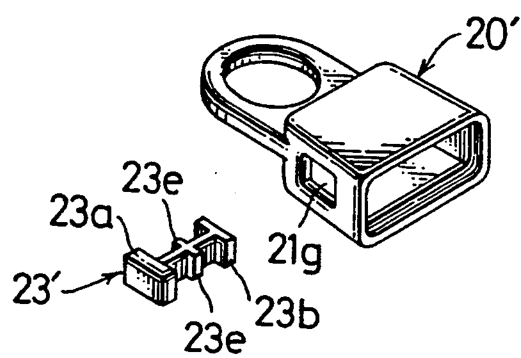
FIG. 5 is an exploded perspective view of a modified form of connecting means.

FIG. 5 illustrates a modified form of clamper 20' which differs from the clamper 20 already described in that the window 21*g* is formed in one of the side walls 21*c*, 21*c* and further in that an anchoring member 23' is provided with fins 23*e* projecting laterally on opposite sides of the post 23*c* between the upper plate 23*a* and the lower plate 23*b*.

Figure 4:
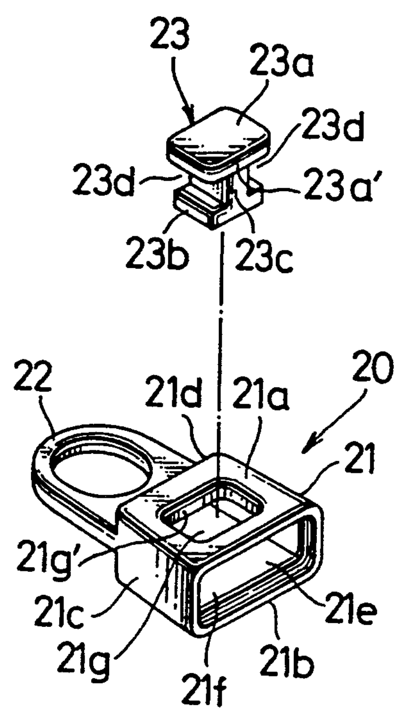
FIG. 4 is an exploded perspective view of a connecting means for connecting the pull tab body to the slider.
Figure 6:
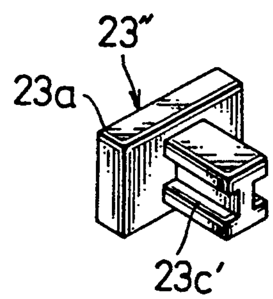
FIG. 6 is a perspective view of a modified component part of the connecting means.

FIG. 6 shows a modified form of anchoring member 23'' which comprises a rectangular upper plate 23*a* similar to that shown in FIG. 4 and an "I" beam retainer 23*c'* extending downwardly therefrom.

There may be other modifications of the clamper 20 conceivable within the context of the appended claims.

Figure 7:
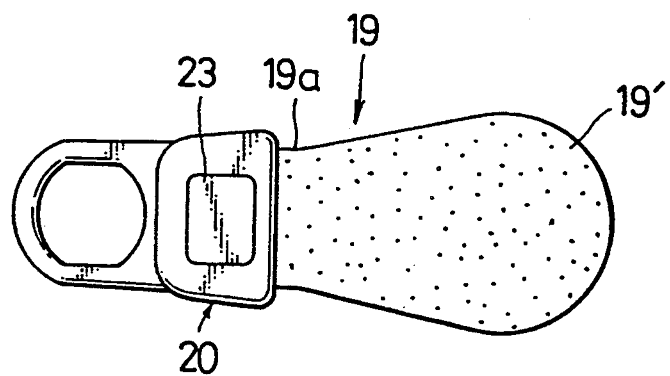
FIG. 7 is a plan view of a modified form of slider pull tab according to the invention.

FIG. 7 shows a modified form of pull tab body 19' which differs from the counterpart 19 only in that it is made up solely from the web portion 19*a* devoid of the loop portion 19*b*.

Obviously, various modifications and variations of the present invention are possible in the light of the above teaching. It is therefore to be understood that within the scope of the appended claims the invention may be practiced otherwise than as specifically described.

What is claimed is:

1. A slider pull tab for a slide fastener which comprises a pull tab body having a web portion formed by molding an elastic, flexible material; a connecting means made from a rigid material and having a chamber for receiving a molding material (M) to form an integral joint with one end of said pull tab body, said connecting means having a window communicating with said chamber; and an anchoring member adapted to extend through said window into said chamber and having a retainer means for anchoring said molding material (M).

2. A slider pull tab for a slide fastener according to claim 1 wherein said window has a flared marginal edge and said connecting means has a tapered peripheral edge dimensioned to fit complimentarily with said flared edge.

3. A slider pull tab for a slide fastener according to claim 1 wherein said pull tab body is formed by injection-molding.

4. A slide pull tab for a slide fastener according to claim 1 wherein said window is formed in the upper portion of said connecting means.

5. A slide pull tab for a slide fastener according to claim 1 wherein said window is formed in either side of said connecting means.

6. A slide pull tab for a slide fastener according to claim 1 wherein said pull tab body has a loop portion.

7. A method of making a slider pull tab which comprises mounting a connecting means made from rigid material in a cavity of a lower mold, said connecting means having a chamber for receiving a molding material (M) and a window communicating with said chamber, inserting an anchoring member through said window into said connecting means, closing an upper mold over said lower mold and injecting the molding material (M) thereby forming a pull tab body integrally with said connecting means.

* * * * *